(12) United States Patent
Southworth

(10) Patent No.: US 8,458,009 B1
(45) Date of Patent: Jun. 4, 2013

(54) METHOD AND SYSTEM FOR ESTIMATING COSTS FOR A COMPLEX PROJECT

(76) Inventor: J. Scott Southworth, Framingham, MA (US)

( * ) Notice: Subject to any disclaimer, the term of this patent is extended or adjusted under 35 U.S.C. 154(b) by 1380 days.

(21) Appl. No.: 11/580,395

(22) Filed: Oct. 13, 2006

Related U.S. Application Data

(60) Provisional application No. 60/726,743, filed on Oct. 14, 2005.

(51) Int. Cl.
*G06Q 10/00* (2006.01)
*G06Q 30/00* (2012.01)
*G06F 17/00* (2006.01)
*G06G 7/00* (2006.01)

(52) U.S. Cl.
USPC .......................... 705/7.35; 705/1.1; 705/400

(58) Field of Classification Search
USPC .................. 705/1.1, 7.11–7.35, 400; 707/100
See application file for complete search history.

(56) References Cited

U.S. PATENT DOCUMENTS

| | | | |
|---|---|---|---|
| 5,189,606 A | 2/1993 | Burns et al. | |
| 5,767,848 A | 6/1998 | Matsuzaki et al. | |
| 5,793,632 A | 8/1998 | Fad et al. | |
| 5,815,638 A | 9/1998 | Lenz et al. | |
| 6,275,987 B1 | 8/2001 | Fraley et al. | |
| 6,351,734 B1 | 2/2002 | Lautzenheiser | |
| 6,445,968 B1 | 9/2002 | Jalla | |
| 6,556,992 B1 * | 4/2003 | Barney et al. | 707/6 |
| 6,738,736 B1 | 5/2004 | Bond | |
| 6,810,383 B1 | 10/2004 | Loveland | |
| 6,973,441 B1 * | 12/2005 | Jaggi | 705/40 |
| 2002/0026343 A1 * | 2/2002 | Duenke | 705/8 |
| 2003/0018952 A1 | 1/2003 | Roetzheim | |
| 2003/0055702 A1 | 3/2003 | Waterston | |
| 2003/0070157 A1 * | 4/2003 | Adams et al. | 717/101 |
| 2003/0225605 A1 * | 12/2003 | Yokota et al. | 705/7 |
| 2004/0148209 A1 | 7/2004 | Church et al. | |
| 2004/0148294 A1 * | 7/2004 | Wilkie et al. | 707/100 |
| 2004/0186757 A1 * | 9/2004 | Starkey | 705/7 |
| 2004/0193474 A1 | 9/2004 | Digiacomo | |
| 2004/0194055 A1 | 9/2004 | Galloway et al. | |
| 2005/0240903 A1 | 10/2005 | Lake | |
| 2006/0106657 A1 | 5/2006 | Pollak et al. | |

FOREIGN PATENT DOCUMENTS

BE 1011617 11/1999

OTHER PUBLICATIONS

Hart, Geoffrey J.S.; "Estimating Project Times and Costs," Intercom, Apr. 2006, 6-10, 53-4, Society for Technical Communication, Arlington, Virginia.

\* cited by examiner

Primary Examiner — George Chen
(74) Attorney, Agent, or Firm — J. Scott Southworth

(57) ABSTRACT

A method and system for estimating complex projects including one or more tasks. The estimating system includes a user interface, an analyzer, and an estimator. The system determines characteristics for a basic task, and receives an assigned cost for the basic task. Then task information for the complex project is analyzed based on the characteristics of the basic task. The system then determines costs for one or more additional tasks, complexity, input timing, and input quality, and estimates the total project cost based on these costs.

9 Claims, 9 Drawing Sheets

3. Determine page factor variable for the number of additional pages (not including figures) (PAGFAC) (e.g., additional pages divided by basic pages) (for the additional page input cost): _____

Weighting Factor (e.g., 0.5) W2 _____

Additional page input cost:     W2 x PAGFAC x BCOST= _____

⎱ 206

4. Determine figure factor variable for the number of additional figures (not including figures) (FIGFAC) (e.g., additional figures divided by basic figures) (for the additional figure input cost): _____

Weighting Factor (e.g., 0.5) W3 _____

Additional figure input cost:     W3 x FIGFAC x BCOST= _____

⎱ 208

5. Determine a measure of complexity of the content (COMP) (for the complexity cost): _____

Determine total number of tasks (NUMT) _____
Weighting Factor (e.g., 1) W4 _____

Complexity cost:     W4 x COMP x NUMT x BCOST= _____

6. Determine a measure of the timing for additional new input (TIME) (for an input timing cost):

Determine the number of tasks that will be (or have been) submitted late (NUML) _____

Weighting Factor (e.g., 1) W5 _____

Input timing cost:     W5 x TIME x NUML x BCOST= _____

⎫ 212

7. Determine a measure of the quality of the input (QUAL) (for a quality cost): _____

Determine total number of tasks (NUMT) _____

Weighting Factor (e.g., 1) _____

Input quality cost:     W6 x QUAL x NUMT x BCOST)= _____

⎫ 214

8. Determine a market factor (discount or surcharge) (MARKET)

Market variable: MARKET: _____

⎫ 216

9. For total project cost, add up items 1 through 8:

Total Project Cost: _____

METHOD AND SYSTEM FOR ESTIMATING COSTS FOR A COMPLEX PROJECT

RELATED APPLICATION

This application claims the benefit of U.S. Provisional Patent Application No. 60/726,743, titled "Method and System for Estimating Costs for a Complex Project," filed on Oct. 14, 2005, the entire teachings of which are incorporated herein by reference.

BACKGROUND

The costs for complex projects with one or more tasks can be estimated by examining input information or descriptions of the project. Such estimates are typically made by some assessment of total effort required (e.g., size of the final product) leading to a total estimate of hours or cost, typically based on judgments of the amount of information to be covered and the estimator's experience and subjective assessment.

Estimating systems exist for clearly specified projects, such as construction projects. Typically, estimates can be based on detailed construction plans and detailed specifications, leading to labor and materials estimates.

SUMMARY

In one aspect, the invention features a method for estimating a cost of a project including one or more tasks. The method includes determining characteristics for a basic task in a predetermined type of project, including an input quantity for the basic task. The method also includes receiving an assigned cost for the basic task; and receiving task information for an expected project including initial task information for an initial task and additional task information for additional tasks. The expected project includes the initial task and the additional tasks. The method also includes analyzing the task information based on the basic task characteristics; and determining costs including an additional task cost, an additional input cost, a complexity cost, an input timing cost, and an input quality cost, the costs based on analyzing the task information. The method also includes estimating a total project cost for the expected project based on the basic task cost, the additional task cost, the additional input cost, the complexity cost, the input timing cost, and the input quality cost.

In one embodiment, the method further includes determining the additional cost for the additional tasks based on the basic task characteristics; determining an amount of total additional input based on the additional task information and one or more predetermined minimums based on the basic task characteristics, and a total additional input cost based on the amount of total additional input; determining the complexity cost based on an assessment of complexity of the initial task and the additional tasks; determining the input timing cost based on a timing of receiving of delayed input; and determining the input quality cost based on a quality of preparation of the initial task information and the additional task information.

In another embodiment, the method includes estimating the total project cost based on a numeric scale having a range of numbers.

The project, in one embodiment, is a technical writing project and the task information is technical writing task information.

The project, in another embodiment, is a patent related project and the task information is patent related task information.

The project, in a further embodiment, is a software project and the task information is software task information.

In one embodiment, the method includes summing the basic cost, the additional task cost, the additional input cost, the complexity cost, the input timing cost, and the input quality cost. The additional task cost is (W1×NUMA× BCOST), wherein NUMA is a number of additional tasks beyond the basic task and BCOST is the cost for a basic task, wherein the input quantity is based on a predetermined number of pages and figures received as input for the basic task. The additional input cost is a sum of (W2×PAGFAC× BCOST) and (W3×FIGFAC×BCOST), wherein PAGFAC is a page factor variable for a number of additional pages beyond a predetermined minimum number of input pages, and FIGFAC is a figure factor variable for a number of additional figures beyond a predetermined minimum number of input figures. The complexity cost is (W4×COMP×NUMT× BCOST), wherein COMP is a measure of the complexity of the initial task and the additional tasks, and NUMT is a total number of the tasks. The input timing cost is (W5×TIME× NUML×BCOST), wherein TIME is a variable representing a timing for receiving of delayed input, and NUML is a number of tasks that are received late. The input quality cost is (W6× QUAL×NUMT×BCOST), wherein QUAL is a variable representing a quality of preparation of input information. W1, W2, W3, W4, W5, and W6 are optional weighting factors.

In another aspect, the invention features a system for estimating a cost of a project including one or more tasks. The system includes an analyzer that analyzes information about the project to be estimated, and an estimator that estimates the cost for the project. The analyzer determines characteristics for a basic task in a predetermined type of project, including an input quantity for the basic task. The analyzer receives an assigned cost for the basic task and receives task information for an expected project including initial task information for an initial task and additional task information for additional tasks. The expected project includes the initial task and the additional tasks. The analyzer analyzes the task information based on the basic task characteristics; and the analyzer determines costs including an additional task cost, an additional input cost, a complexity cost, an input timing cost, and an input quality cost, the costs based on analyzing the task information. The estimator estimates a total project cost for the expected project based on the basic task cost, the additional task cost, the additional input cost, the complexity cost, the input timing cost, and the input quality cost.

In one embodiment, the analyzer determines the additional cost for the additional tasks based on the basic task characteristics. The analyzer determines an amount of total additional input based on the additional task information and one or more predetermined minimums based on the basic task characteristics, and a total additional input cost based on the amount of total additional input. The analyzer determines the complexity cost based on an assessment of complexity of the initial task and the additional tasks. The analyzer determines the input timing cost based on a timing of receiving of delayed input; and determines the input quality cost based on a quality of preparation of the initial task information and the additional task information.

The estimator, in another embodiment, estimates the total project cost based on a numeric scale including a range of numbers.

In another aspect, the invention features a system for estimating a cost of a project including one or more tasks. The system includes means for determining characteristics for a basic task in a predetermined type of project, including an input quantity for the basic task. The system also includes means for receiving an assigned cost for the basic task, and receiving task information for an expected project including initial task information for an initial task and additional task information for additional tasks. The expected project includes the initial task and the additional tasks; The system also includes means for analyzing the task information based on the basic task characteristics; and means for determining costs including an additional task cost, an additional input cost, a complexity cost, an input timing cost, and an input quality cost, the costs based on analyzing the task information. The system also includes means for estimating a total project cost for the expected project based on the basic task cost, the additional task cost, the additional input cost, the complexity cost, the input timing cost, and the input quality cost.

In one embodiment, the system also includes means for determining the additional cost for the additional tasks based on the basic task characteristics, and means for determining an amount of total additional input based on the additional task information and one or more predetermined minimums based on the basic task characteristics, and a total additional input cost based on the amount of total additional input. The system also includes means for determining the complexity cost based on an assessment of complexity of the initial task and the additional tasks, and means for determining the input timing cost based on a timing of receiving of delayed input. The system also includes means for determining the input quality cost based on a quality of preparation of the initial task information and the additional task information.

In another aspect, the invention features a computer program product embodied in a computer readable medium having instructions for estimating a cost of a project including one or more tasks, such that the instructions, when carried out by a processor of an estimating device, configure the estimating device to perform the steps of determining characteristics for a basic task in a predetermined type of project, including an input quantity for the basic task; and receiving an assigned cost for the basic task and task information for an expected project including initial task information for an initial task and additional task information for additional tasks. The expected project includes the initial task and the additional tasks. The instructions also configure the estimating device to perform the steps of analyzing the task information based on the basic task characteristics; determining costs including an additional task cost, an additional input cost, a complexity cost, an input timing cost, and an input quality cost, the costs based on analyzing the task information; and estimating a total project cost for the expected project based on the basic task cost, the additional task cost, the additional input cost, the complexity cost, the input timing cost, and the input quality cost.

In one embodiment the instructions further configure the estimating device to perform the steps of determining the additional cost for the additional tasks based on the basic task characteristics; determining an amount of total additional input based on the additional task information and one or more predetermined minimums based on the basic task characteristics, and a total additional input cost based on the amount of total additional input; determining the complexity cost based on an assessment of complexity of the initial task and the additional tasks; determining the input timing cost based on a timing of receiving of delayed input; and determining the input quality cost based on a quality of preparation of the initial task information and the additional task information.

The computer program product, in another embodiment, is a computer program propagated signal product embodied in a propagated medium.

BRIEF DESCRIPTION OF THE DRAWINGS

The above and further advantages of this invention may be better understood by referring to the following description in conjunction with the accompanying drawings. The drawings are not necessarily to scale, emphasis instead being placed upon illustrating the principles of the invention.

DETAILED DESCRIPTION

Figure 1:
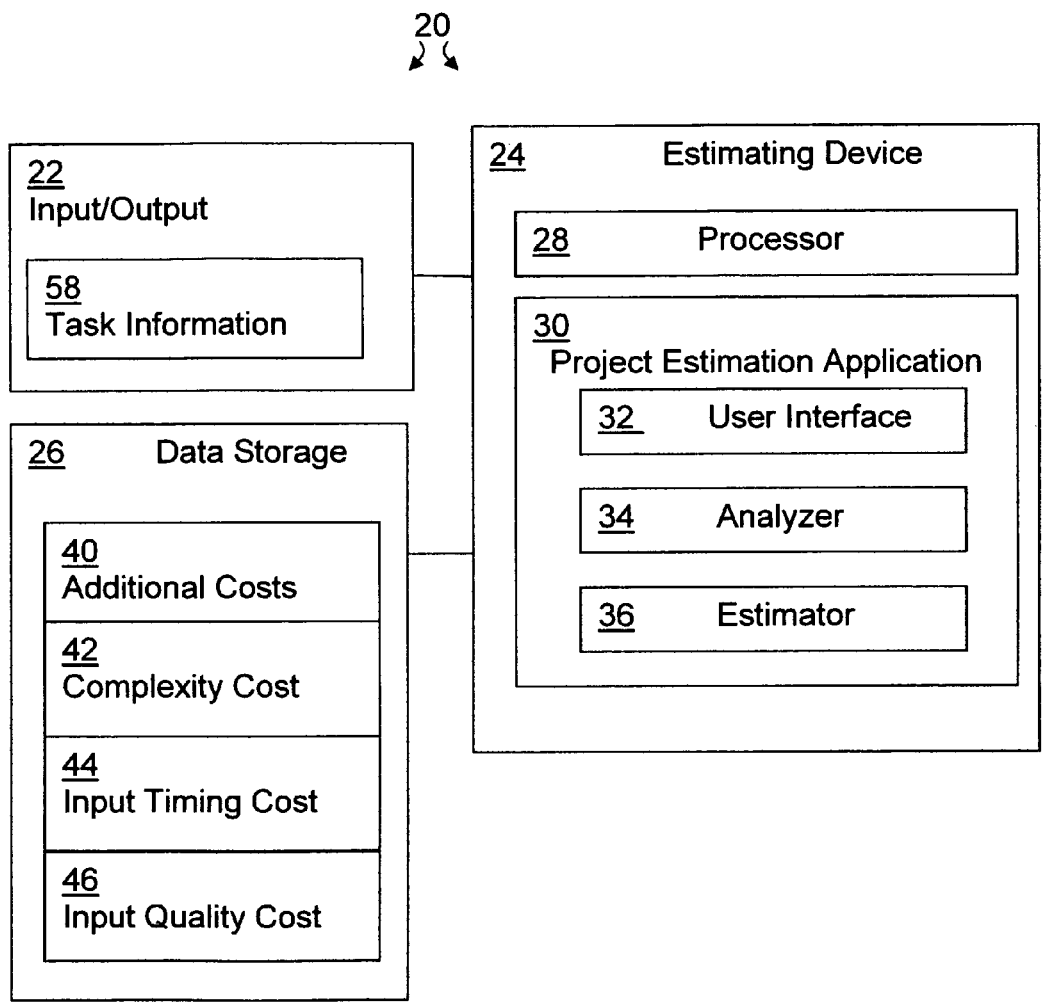
FIG. 1 is a schematic diagram of an estimating system according to the principles of the invention.

Conventionally, the time and effort for complex projects are sometimes estimated according to various criteria. Complex projects can include technical writing projects, legal projects (e.g., patent applications), and software development projects. For the example of a writing project, such projects include writing of technical specifications, technical manuals, and complex documents. Complex documents can include documents having multiple conceptual dimensions, such as patent specifications, which include both legal, technical, and editorial dimensions. Such estimates are typically made by some assessment of total effort required (total number of pages expected in the final product) leading to a total estimate of hours or cost, typically based on judgments of amount of information to be covered and the estimator's experience and subjective assessment of the individual doing the estimate. Some estimates are based on broad categorization into a limited number of categories (e.g., in the field of technical writing, for categories, such as a getting started guide versus an advanced programming technical manual).

There is a need for a more systematic approach that lessens the effect of subjective criteria, provides a credible estimate without requiring the individual doing the estimate to have many years of experience, and addresses issues of uncertainty, such as those caused by incomplete or delayed input, and/or complexity of the task or project. Complex projects typically include multiple tasks that have varying levels of complexity. There is a need for project estimating approach that accounts for varying levels of complexity, the variation of input information (e.g., various levels of detail in input specifications), and variation in timing for receiving input information. In particular, input information can vary in the quantity of input and quality of input, sometimes from task to task.

In overview, the present invention relates to a method and system for estimating the cost and/or effort for a complex project involving one or more tasks. The general approach of the invention is to separate different parts of the cost estimate analysis, such as complexity and amount of initial task information provided, so that each part can be evaluated separately.

A problem occurs when requestors of the task (e.g., clients or customers) provide additional concepts and/or amounts of description as the project proceeds. This problem of delayed or late input can be referred to as a task expansion problem. The approach of the invention provides a more systematic way of responding to late input by estimating the increased cost due to expansion problems. This approach provides a foundation for discussion of cost changes with the requestor of the project.

The approach of the present invention provides a way for more systematically responding to such problems by including them in initial estimates if late input is anticipated, as well as revised estimates, if unanticipated late input is received. A basic task is defined with a basic expectation of input information, a set of basic task characteristics, and cost of completing the basic task. Other tasks are compared to this task for characteristics such as the amount of input information, its quality, its timing, and its complexity. Additional costs are based on these characteristics and the basic task cost. In addition, the estimates can be adjusted for a new task based on past track records and/or a user's judgment by using weighting factors.

An administrator of the project estimation application provides input at a higher level than a user, and this input can apply to a group or class of estimates. For example, an administrator can provide input that a certain type of estimate be treated in a certain manner. More particularly, if a certain requestor of projects is known to provide incomplete or late specifications, then the administrator can make adjustments (e.g., to a weighting factor) to account for the expected lack of complete input. The approach of the invention allows for estimated costs to be considered analytically and systematically, such as cost of total additional input over that required for a well defined basic task, the cost of delayed input, cost of a complex task or project, and cost of low quality input information.

FIG. 1 is a schematic diagram of an estimating system 20 according to the principles of the invention. The system 20 shown in FIG. 1 includes input/output components 22, an estimating device 24, and a data storage device 26. One or more of the input/output component(s) 22 provide input and output for a user of the estimating device 24. In one embodiment, the input components 22 include a mouse and keyboard, and the output component 22 includes a visual display (e.g., displayed on a cathode ray tube, or flat panel electronic device).

The estimating device 24 includes a processor 28 (e.g., digital microprocessor), and a project estimation application 30. The project estimation application 30 includes instructions which are stored in a memory, such as a volatile memory (e.g., RAM or random access memory) and/or nonvolatile memory (e.g., hard disk or ROM or read-only memory). The processor 28 executes the instructions of the project estimation application 30 to perform the functions of the invention as described herein.

The project estimation application 30 includes a user interface 32, an analyzer 34, and an estimator module 36, in one embodiment. The user interface module 32 provides an interface to a user of the estimating device 24. The user provides input to and receives output from the project estimation application 30 through the user interface 32 provided through the input and output components 22. For example, the user enters input for the project estimation application 30 through an interface 32 (e.g., graphic user interface or GUI) displayed on the visual display connected to or incorporated as a part of the estimating device 24. Preferably, the user of the project estimation application 30 is an individual experienced in estimating and in using the project estimation application 30. In one embodiment, the user interface module 32 is implemented as one or more user interfaces. For example, a separate user interface can be implemented for an administrator or other user to provide and receive administrative information, and/or to provide set-up information, such as entering the weighting values (e.g., $W_1$, $W_2$, $W_3$, $W_4$, $W_5$, $W_6$, and $W_7$, described elsewhere herein) and/or the basic task cost 56.

The analyzer module 34 analyzes information received from the user or other sources about a project to be estimated. In various embodiments, the analyzer module 34 can be implemented as one or more analyzers, or the analyzer module 34 can have one or more analyzing components and/or subcomponents. The estimator module 36 provides an estimate for a project or a task that is part of a project based on information received from the user interface module 32 and information provided by the analyzer module 34. In various embodiments, the estimator module 36 can be implemented as one or more estimators, or the estimator module 36 can have one or more estimating components and/or subcomponents.

The data storage device 26 is a mechanical or electronic device that stores data persistently, such as a hard disk, or persistent IC (integrated circuit) data storage device. The data storage device 26 stores data about additional costs 40, a complexity cost 42, an input timing cost 44, and an input quality cost 46. The additional costs 40 are costs for additional tasks and total additional input beyond what is defined for a basic task that is a well-defined task for a given project. The additional tasks measure how many additional tasks beyond the basic task are in a planned or expected project, based on the task information 58 received for the expected project. The task information 58 includes initial task information for the first or initial task in the expected project, and additional task information for one or more additional tasks in the expected project. For example, if a basic project includes one basic task, and the expected project to be estimated includes three planned or expected tasks, then the additional tasks has a value of 2 for two additional tasks beyond the basic task. The approach of the invention does not require that a basic project have one basic task, and the typical basic project can include two or more tasks if this is deemed typical for a certain type of basic project.

The additional costs 40 include an additional input cost 64 (see FIG. 2) that is based on the amount of additional input beyond that expected for the basic project. This additional input for each task is input beyond what is expected for a basic task. If a project includes several tasks, then the additional input is the amount of input beyond what is expected if every task is a basic task, beyond predetermined minimums established for the basic task. For example, if a basic writing project is defined as one task based on an input quantity 5 pages of input, and the amount of total input for the planned project is 12 pages, then the amount of additional input is 7 pages. Generally, the amount of input for the predetermined minimums is what is considered a typical minimum amount of information to properly document a basic task. However, the basic task is not required to have an amount equal to the predetermined minimums or numbers that are considered typical for a basic task, but the amount of input can be less. That is, in some cases, the basic task can be properly documented by an amount of input that is less that the typical predetermined minimums.

The complexity cost 42 is based on the complexity of the planned project, which is determined by the complexity of the input information based on the task information 58 received for the planned project. In one embodiment of the invention, an experienced and/or expert user can analyze the task information 58 to determine the complexity. In another embodiment, the analyzer module 34 performs an analysis of the task information 58 to determine its level of complexity. For example, the analyzer module 34 analyzes the level and type of vocabulary used in the input information 58 (e.g., a design specification) to assign a complexity value or level for the planned project.

The input timing cost 44 is based on when the input information included in the task information 58 is received. The input timing cost 44 is given a low or zero value if all input information is received at the beginning of the project (e.g., when the estimate is being made for the planned project). If it is expected that some input information will not be received until a later date (that is, the task information 58 is not yet complete), then the input timing cost 44 is assigned a medium or high value. The input timing cost 44 accounts for the greater difficulty and effort needed when receiving additional input information or delayed input 59 (see FIG. 2) after the start of the project. If unplanned or unexpected input information 59 is received after the start of the project, a medium or high value can be assigned to the input timing cost 44, and the estimator module 36 performs a revised estimate (e.g., total project cost 66) for the planned project (see FIG. 5).

The input quality cost 46 measures the quality of the input information based on the task information 58. The input quality cost 46 receives a low or zero value if the input quality is high, and a medium or high value if the input quality is low. In one embodiment, a user assesses the quality of the input and assigns a value to the input quality cost measure 46. If the number of input pages is low given the complexity of the project and other issues, then the input quality is judged as low. In such a situation, the implementer of the project is required to spend time on more analysis, and more verbal discussion with the requestor of the project and/or other implementers. In another embodiment, the project estimation application 30 analyzes the quality of the input, such as by using a software approach, such as intelligent software techniques. For example, the analyzer module 34 measures the grammatical level, and/or spelling level of input documents to provide a quality measure. In addition, the analyzer 34 can measure the type and level of terminology to determine if it is appropriate for and reflects the technology of the project. That is, the analyzer can use software analysis to determine if the terms and vocabulary used in the task information 58, 59 match the expected technical terms for the technology area.

Figure 2:
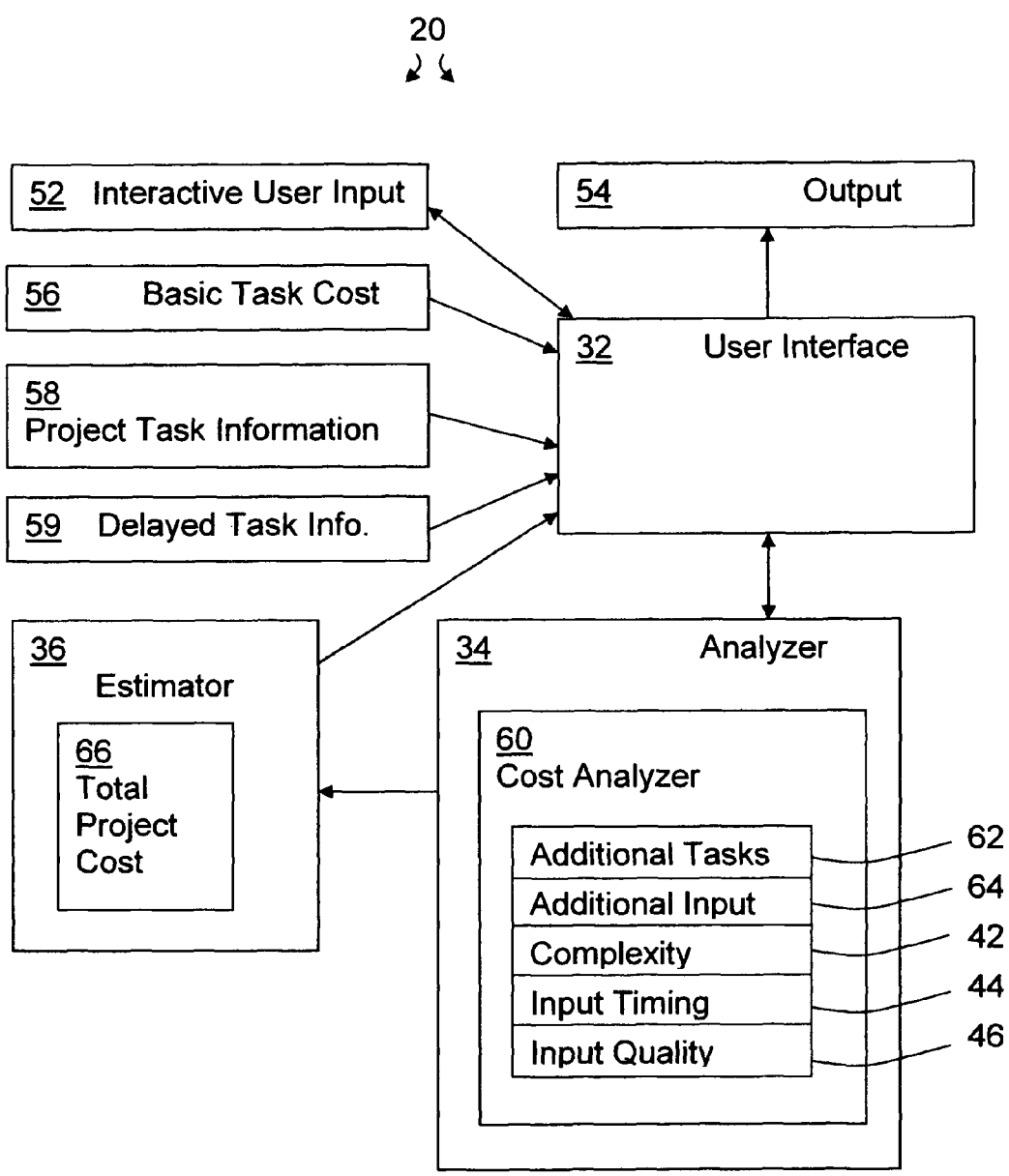
FIG. 2 is a data flow diagram according to the principles of the invention.
Figure 3:
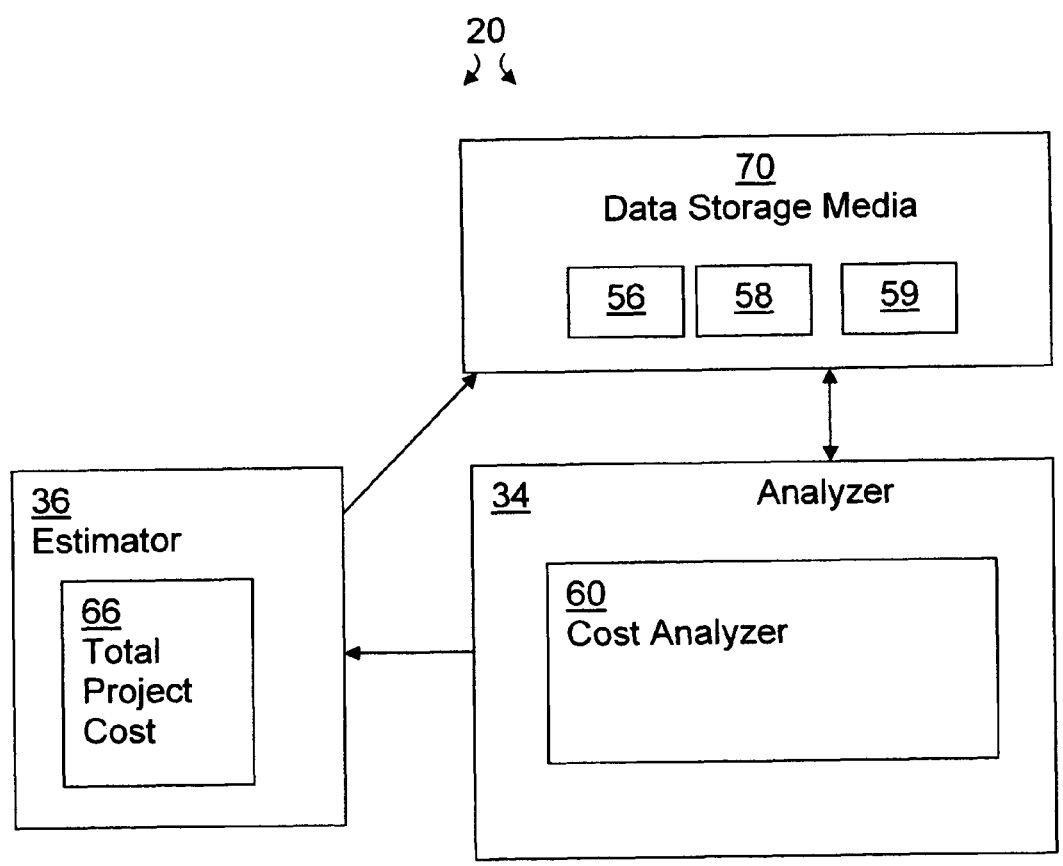
FIG. 3 is a data flow diagram including a data storage medium, according to the principles of the invention.

FIG. 2 is a data flow diagram for an estimating system 20 including a user interface 32 according to the principles of the invention. The estimating system 20 shown in FIG. 2 can include a memory and/or data storage that supports the components 32, 34, 36 shown in FIG. 2. FIG. 3 is a data flow diagram for an estimating system 20 including a data storage media 70 for previously stored input according to the principles of the invention.

A user provides interactive input 52 to the user interface module 32. This input 52 may be in response to output 54 that is displayed to the user through the user interface 32 (e.g., GUI). The user interface module 32 also receives basic task cost 56 and project task information 58, which is input by the user. Alternatively the basic task cost 56 and project task information 58 are provided to an input/output module (not shown) as input from a storage media 70, such as a diskette, CD-ROM, DVD, or other suitable storage media, or through a network connection to a local area network (LAN), Internet Protocol (IP) network (e.g., the Internet), or other suitable network (see FIG. 4). The analyzer module 34 receives the input information 52, 56 58, 59 provided through the user interface module 32 or data input/output module associated with the data storage media 70. The analyzer module 34 can also respond to the data received. For example, the analyzer module 34 can return queries or data to be displayed in the output display 54 to the user to obtain a response from the user, or direct data requests to the storage media 70 that provides the input information 52, 56, 58, 59. Such queries can be used to ask for additional detail or new data related to the previously received data. For example, if the user is providing the input information 52 (e.g., by filling out data fields in a GUI 32), the analyzer module 34 can provide queries to be displayed in the user interface output 54 viewed by the user asking for further information or further detail.

The analyzer module 34 includes a cost analyzer 60 that processes the input information 52 and provides cost data to the estimator module 36. The cost data includes one or more of various costs, such as the additional task cost 62, the additional input cost 64, the complexity cost 42, input timing cost 44, and/or input quality cost 46. In one embodiment, the additional task cost 62 and the additional input cost 64 are part of the additional costs 40. In various embodiments, the cost analyzer 60 provides costs in various approaches reflecting the effort or cost of the variables 62, 64, 42, 44, 46, such as monetary (e.g., dollar) values, time values (e.g., amount of hours expended), numeric scales (e.g., values between 1 and 10), relative numeric values (by comparing costs), and/or other suitable measures. The estimator module 36 produces a total project cost 66 which is transferred to the user interface 32 for display as output 54 to the user. Alternatively, the total project cost 66 is output to the storage media 70 for storage for later use, or to a network connection 82 for transfer over a network for storage, output, or display elsewhere (see FIG. 4).

Figure 4:
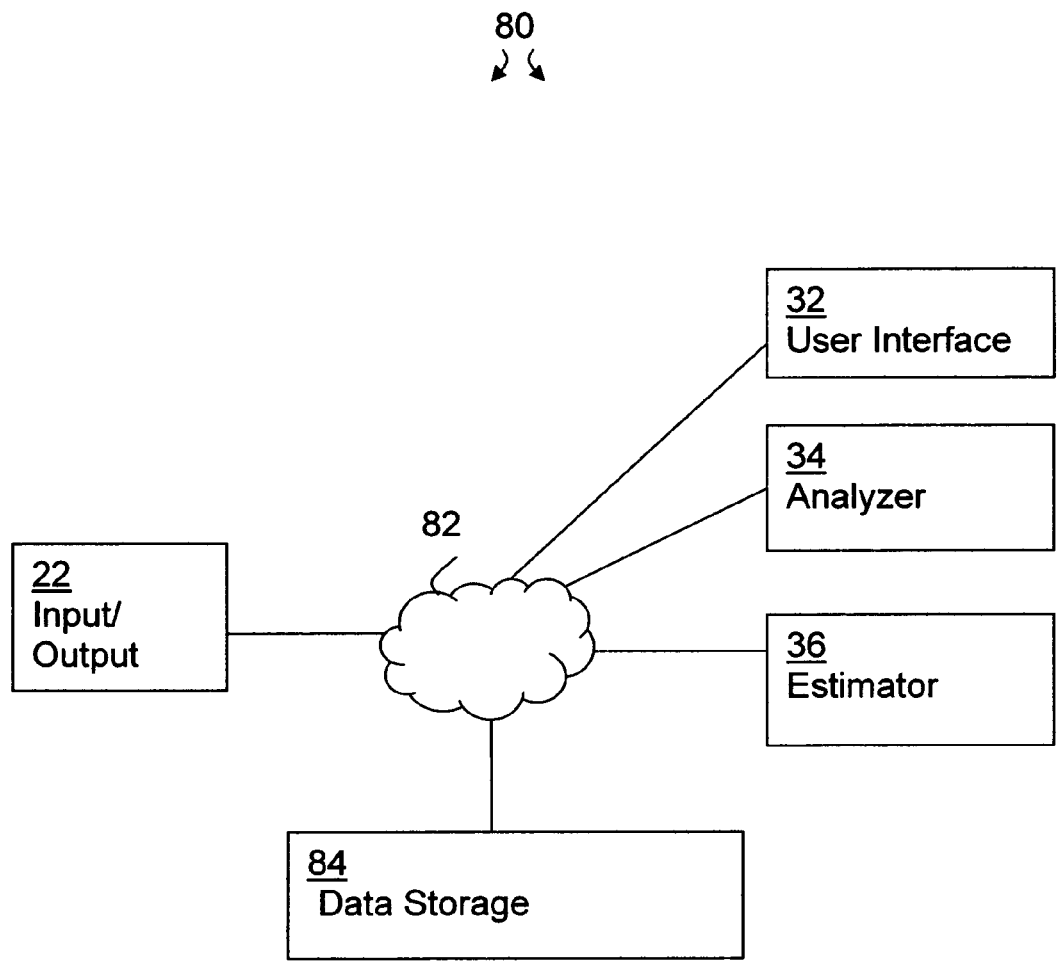
FIG. 4 is a networked estimating system, according to the principles of the invention.

FIG. 4 shows a networked estimating system 80 including a network connection 82 connecting an input/output components 22, data storage 84, the user interface module 32, the analyzer 34, and the estimator 36. The network connection 82 is one or more networking or communications connections providing communications among the input/output 22, data storage 84, the user interface module 32, the analyzer 34, and the estimator 36. The network connection 82 provides communications by means of hard-wired and/or wireless communications, such as cellular telephone communications, other radio wave communications, or other suitable electromagnetic wave communications. Suitable communications protocols for the network and communications connections 82 include CDMA (Code Division Multiple Access), iDEN (Integrated Dispatch Enhanced Network), GSM (Global System for Mobile Communications), GPRS (General Packet Radio Service), EvDO (Evolution Data Only), EDGE (Enhanced Data for GSM Evolution), 1xRTT, PDP (Packet Data Protocol), IEEE 802.11 (including 802.11a, 802.11b, and 802.11g), IEEE 802.15 (including 802.15.4), ZigBee, Bluetooth, wireless metropolitan area network (MAN) communications, WiMAX (IEEE 802.16 including 802.16d and 802.16e), Insteon™, satellite communications, X10, Power Line, cable connections, and other suitable protocols and technologies. Alternatively, the network and communications connections 82 are by telecommunications and line connections, network connections, the Internet (TCP/1P or UDP/IP protocols), WAP (Wireless Application Protocol), or other suitable connections. The software of the invention (e.g. project estimation application 30, the user interface 32, the analyzer 34, and/or the estimator 36) can be propagated and/or installed over any of the communications protocols or connections described herein.

The data storage 84 includes volatile memory (e.g., RAM or random access memory) and/or nonvolatile memory (e.g., one or more hard disks or ROM or read-only memory). The input/output components 22 can be associated with a computing device, such as a personal computer, client computer, laptop computer, PDA (personal digital assistance), mobile electronic mail device, mobile telephone, that communicates over the network 82 with the data storage 84, and other modules 32, 34, 36. The user interface module 32, the analyzer 34, and estimator 36 can be located on one computing device, such as a personal computer, server computer, or other computing device, or located on one or more separate computing devices (e.g., distributed computing approach). The data storage device 84 can be associated with one or more of the input/output components 22, the user interface module 32, analyzer module 34, and/or estimator module 36. Alternatively the data storage device 84 is an independent data storage device, such as a data server, or a data storage service provided over the communications and network connections 82, or other suitable data storage mechanism.

Figure 5:
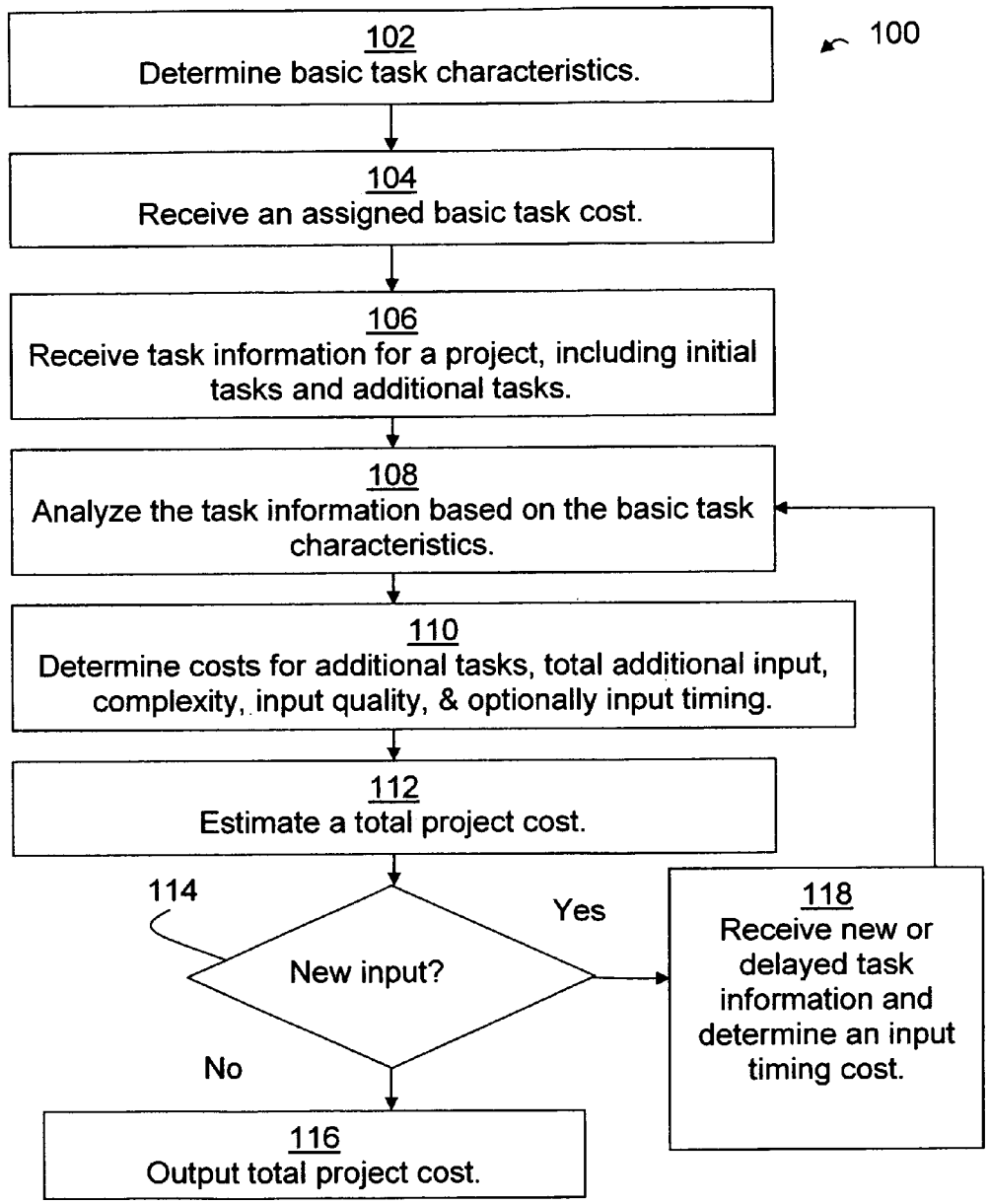
FIG. 5 is a flow chart of an estimating procedure according to the principles of the invention.

FIG. 5 is a flow chart of an estimating procedure 100 according to the principles of the invention. The first step 102 is to determine the basic task characteristics including a quantity of input information. For example, a basic task can be defined as a predetermined input quantity (also termed "predetermined minimums) such as 5 pages of input specification and 2 input figures. The next step 104 is to receive an assigned basic task cost 56 for a defined basic task. Alternately, the procedure can determine a value for the basic task cost through a software analysis, such as a rules-based analysis, comparison to basic costs for other projects, analyzing information provided by a user (the size and characteristics of a basic task), performing some other machine learning or intelligent analysis, and other approaches. The user identifies the basic task cost 56, which may be represented in hourly terms, cost terms, numeric values, or other terms, for an implementer of a certain level of experience. A basic project can be defined as having one or more basic tasks. The next step 106 is to receive the task information 58 for a project, including initial tasks and additional tasks.

The next step 108 is to analyze the task information 58 based on the basic task characteristics. The analyzer module 34 evaluates the number of tasks to determine if there are more than those identified for a basic project, to determine how many additional tasks there are That is, if there are six tasks, and a basic project has been defined to have one basic task, then the number of additional tasks is five. The analyzer module 34 also evaluates the input information 58 received for the project to determine the additional input. For example, if the total amount of input information 58 is 10 pages, and the basic task is typically based on input information of 2.5 pages, then the additional input is 7.5 pages. In another example, if the total amount of input information 58 is 10 pages, but the project includes four tasks, each having no more than 2.5 pages of input, then the additional input is zero. The analyzer module 34 also evaluates a level or measure of complexity 42 and a level or measure of input quality 46.

The next step 110 is to determine an additional task cost 62, a total additional input cost 64, a complexity cost 42, and an input quality cost 46 based on the analysis from the previous step. The next step 112 is to estimate a total project cost 66 based on the additional task cost 62, the total additional input cost 64, the complexity cost 42, and the input quality cost 46 based on the determination from the previous step 110. If some input is expected to arrive later, then the step 112 optionally determines the input timing cost 44 for delayed input 59 and includes it in the total project cost 112.

The next step 114 is to determine if there is new input 59 received after the initial total project cost 66 has been determined in step 112. If there is no new input 59, then the next step 116 is to output the total project cost 66, which can be provided to an output 54 (e.g., GUI 32) for a user, to a storage media 70, or to a network connection 82. If there is new input 59, then the next step is to receive the new task information 59 and determine an input timing cost 44, which reflects a cost for receiving new input 59 on a delayed basis. The procedure 100 then returns to the steps 108, 110, 112 of analyzing the task information 48, determining costs 42, 44, 46, 62, 64, and then estimating a new total project cost 66 (which includes the input timing cost 44). Thus the input timing cost 44 can be optionally determined twice (or more often). First, the input timing cost 44 is optionally determined during step 110 if it is anticipated that some input 59 (not yet received) will be received later. Then, if new or delayed input 59 (not yet included in the input timing cost 44) is received in step 118, the procedure returns to step 110 (through step 108) to calculate a new value for the input timing cost 44 (including information that is now considered new and/or delayed).

More specifically, the approach of the invention in one embodiment can be summarized as based on the following variables:

Basic cost of one task 56

Number of additional tasks

Number of total additional input pages beyond a predetermined minimum

Number of total additional input figures beyond a predetermined minimum

Complexity of the content

Timing of the submission or receiving of delayed input and/or additional input information 59

Quality of preparation of the submitted information (input to the project)

The total project cost 66 (or estimate) is the sum of the basic cost 56, the additional task cost 62, the additional input cost 64 (e.g., additional pages plus additional figures), complexity cost 42, input timing cost 44, and input quality cost 46. In addition, the total project cost 66 can include a term reflecting a market adjustment (e.g., market discount or surcharge).

Equation 1 (shown later herein) demonstrates one approach to using these variables in an equation. The approach of the present invention receives or determines the basic task cost 56 (e.g., indicated by BCOST in a Equation 1) that identifies a basic, well defined task. Other variables may be included such as the number of tasks (see NUMT in Equation 1). An additional variable can be added for the number of additional pages and/or figures beyond the minimum allocated for the basic task.

In one embodiment, the present invention includes weighting factors (see W1, W2, W3, W4, W5, W6 in Equation 1). Generally, the weighting factors can have a value less than one (though not required to do so). For example, the weighting factor for the addition of further input may be less than one, because it takes somewhat less time to process the additional information because some efficiency is gained by having basic concepts previously explained, or being able to reuse existing information. The weighting factors can vary based on the type of complex project.

The following is an estimation equation according to one embodiment of the invention:

$$\text{ESTIMATE} = \text{BCOST} + (W1 \times \text{NUMA} \times \text{BCOST}) + (W2 \times \text{PAGFAC} \times \text{BCOST}) + (W3 \times \text{FIGFAC} \times \text{BCOST}) + (W4 \times \text{COMP} \times \text{NUMT} \times \text{BCOST}) + (W5 \times \text{TIME} \times \text{NUML} \times \text{BCOST}) + (W6 \times \text{QUAL} \times \text{NUMT} \times \text{BCOST}) + \text{MARKET} \quad (1)$$

wherein:

BCOST is the cost of the basic task 56, based on an expected, basic, predetermined number (or predetermined minimums) of pages and figures received as input (for example, 5 pages of double-spaced text and 2 pages of figures) that is considered typical for a complete, but well defined task, where the input is not lengthy or complex. The basic task is typically a simple task, and BCOST is a relatively low number, compared to the cost of completing a complex or lengthy task or a complex project that has several tasks.

The expression (W1×NUMA×BCOST) is, in one embodiment, the additional task cost 62. NUMA is the number of additional tasks beyond the first one, and W1 is a weighting factor usually set to a value of 1 or less. The W1 factor can take into account the fact that somewhat less work is required for the additional task. For example, the W1 factor can have a value of 0.9. If a writing task includes some of the basic concepts already described in an initial task, in one example, then this information does not need to be rewritten or repeated for each additional task; or some of the text for the basic concepts can be copied over, if necessary. In other examples the W1 factor can have a value in a range of 0.1 and 0.9 (typically between 0.4 and 0.7).

The expression (W2×PAGFAC×BCOST) is, in one embodiment, the additional page input cost. PAGFAC is a page factor variable for the number of additional pages (not including figures) beyond the predetermined minimum number, adjusted based on the number of pages defined for the basic task. Thus if the input information provides 11 additional pages for one task and the basic value for the number of pages for a task is 5, then the value of PAGFAC is 6/5, for a value of 1.2 (assuming that there is only one basic task). W2 is a weighting factor set to 1 or less (for example, in a range of 0.1 and 0.9 (typically between 0.4 and 0.7)), on the assumption that somewhat less work may be required for the additional pages, and that there is also a FIGFAC variable additional pages of figures. For example, concepts or text presented in the basic pages make the additional pages easier to understand and work with. If there are several additional tasks, but the number of input pages for each task is no more than the defined number of pages for a basic task, then PAGFAC has a value of 0.

The expression (W3×FIGFAC×BCOST) is, in one embodiment, the additional figure input cost. FIGFAC is a figure factor variable for the number of additional figures beyond the predetermined minimum number, adjusted based on the number of figures defined for the basic task. Thus, if the input information provides 3 additional figures for a task and the basic value for number of figures is 2 (for a basic task), then the value of FIGFAC is 3/2, for a value of 1.5 (assuming that there is only one basic task). W3 is a weighting factor set to 1 or less (for example, in a range of 0.1 and 0.9 (typically between 0.4 and 0.7) on the assumption that somewhat less work may be required for the additional figures, and that there is also a PAGFAC variable. For example, concepts or text presented in the pages and figures of the basic task make the additional figures easier to understand and work with. If there are several additional tasks, but the number of input figures for each task is no more than the defined number of pages for a basic task, then FIGFAC has a value of 0. The weighting factor W3 may also be adjusted in light of text contained in additional pages. For example, if the additional pages provide a mostly complete description of the additional figure, then W3 can have a relatively low value, such as 0.1 or 0.2.

The additional input cost 64 is based on the additional page input cost and the additional figure input cost. In one embodiment, the additional input cost 64 is based on equation 2:

$$\text{ADDITIONALINPUTCOST} = (W2 \times \text{PAGFAC} \times \text{BCOST}) + (W3 \times \text{FIGFAC} \times \text{BCOST}) \quad (2)$$

In another embodiment, the additional input cost 64 is based on the appropriate measure. If the input for the project is based predominantly on text input (and this is sufficient for the tasks to be completed), then the additional input cost 64 is based only on the additional page input costs, which is, in one embodiment, (W2×PAGFAC×BCOST). If the input for the project is based predominantly on figure and/or graphic input (and this is sufficient for the tasks to be completed), then the additional input cost 64 is based only on the additional figure input costs, which is, in one embodiment, (W3×FIGFAC×BCOST).

The expression (W4×COMP×NUMT×BCOST) is, in one embodiment, the complexity cost 42. COMP is a measure or estimate of the complexity of the content of the writing task, with a value typically between 0 (for very simple content) to 1 or higher. For very complex projects, higher values for complexity may be appropriate such, as 2 or 3 or higher. NUMT is the total number of tasks. W4 is a weighting factor that can be set to a value of 1, but allows for a weighting of the complexity issue. For a relatively simple technological area, the weighting factor can be less than one. For a very complex technological area, the weighting factor can be greater than one to increase sensitivity to complexity.

The expression (W5×TIME×NUML×BCOST) is, in one embodiment, the input timing cost 44. TIME is a variable representing the timing for the addition of new input information (receiving delayed input 59), with a value ranging from 0 to 1 or higher. NUML is the number of tasks that have been submitted late. The TIME expression is an additional cost for the late or delayed input or addition of new information 59 (beyond correction and limited changes). The value of TIME can be relatively low, such as 0 or 0.1, if the new input 59 is only slightly delayed or able to be treated independently. W5 is a weighting factor that can be set to a value of 1, but can be adjusted to provide a weighting of the timing issue. That is, if a certain requestor of a project is chronically late in providing additional information for a task, then the W5 weighting factor may be increased for the estimate for a task for that requestor.

The expression (W6×QUAL×NUMT×BCOST) is, in one embodiment, the input quality cost 46. QUAL is a variable representing the quality of preparation of the input information by the requestor, with a value ranging from 0 to 1, with 0 indicating a high quality and 1 a relatively low quality for preparation. W6 is a weighting factor that can be set to a value of 1, but can be adjusted to provide for a weighting of the preparation issue. For example, if a certain requestor chronically provides input specifications of poor quality, then the W6 weighting factor may be increased for the estimate for a new task. Quality characteristics can include clarity of writing, focus, appropriate terminology, proper use of jargon, organization, appropriate level of detail, completeness, readability, and other characteristics. For example, if the initial description is of high quality, but input for additional tasks are of poor quality, then NUMT (the total number of writing tasks) can be replaced with NUMA (the number of additional writing tasks beyond the initial writing task). Alternatively, the variable NUMT can be replaced by a variable NUMQ (which represents the number of writing tasks that are not of high quality).

MARKET is an optional variable that indicates an adjustment for market competitive issues, and may have value of 0, less than 0 (a discount), or higher than 0. The MARKET variable can be a discount when estimating projects for a large client or customer, who is expected to provide a sizeable and steady flow of projects. The MARKET variable can be expressed as a percentage discount, such as 10% or 15% of the sum of the preceding expressions in Equation 1. The MARKET variable can be an additional charge (e.g., positive value) to reflect special issues; for example, if a customer is located in a remote or difficult to reach location, or to reflect other special issues that require more effort for this customer. In one embodiment, the MARKET variable can also have its own weighting factor (e.g., W7).

Weighting factors (e.g., W1, W2, W3, W4, W5, W6, and W7) can be set by the user of the project estimation application 30, or can be set by a supervisor or administrator of the project estimation application 30. Preferably the same weighting factors should be used for a period of time for several projects. Then, the estimates for several projects can be evaluated; for example, by comparing the estimates to actual costs for each project to determine if the estimates are greater or lesser than the actual costs. For a given set of weighting factors, differences between estimates and actual costs can be evaluated to give a comparison value for that set of weighting factors. The weighting factors can be adjusted for a new group of projects, and a new comparison value determined to evaluate whether the newly adjusted weighting factors provide better estimates of actual costs.

ESTIMATE is an estimation of the project cost (the total project cost 66).

In one embodiment, the approach of the invention is implemented as a manual procedure, such as a hard copy worksheet, that the user manually fills out (see the sample worksheet provided elsewhere herein). The worksheet is based on all or part of Equation 1 above. For example, the user can fill out a preprinted worksheet by entering in the appropriate information, and making the appropriate calculations to complete the formula (in Equation 1) provided above. Alternatively, the approach of the invention can be implemented in a software spreadsheet based on Equation 1, which allows for the calculation of cost values and summing of costs to produce the total project cost 66.

Figure 6:
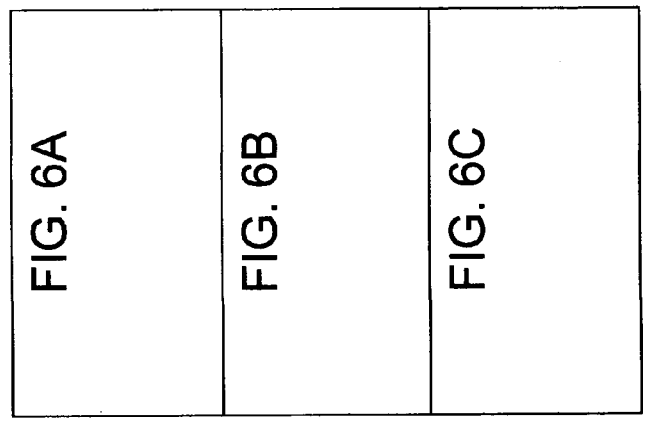
FIG. 6 (with partial views FIGS. 6A, 6B and 6C) is an estimation worksheet, according to the principles of the invention.
Figure 6A:
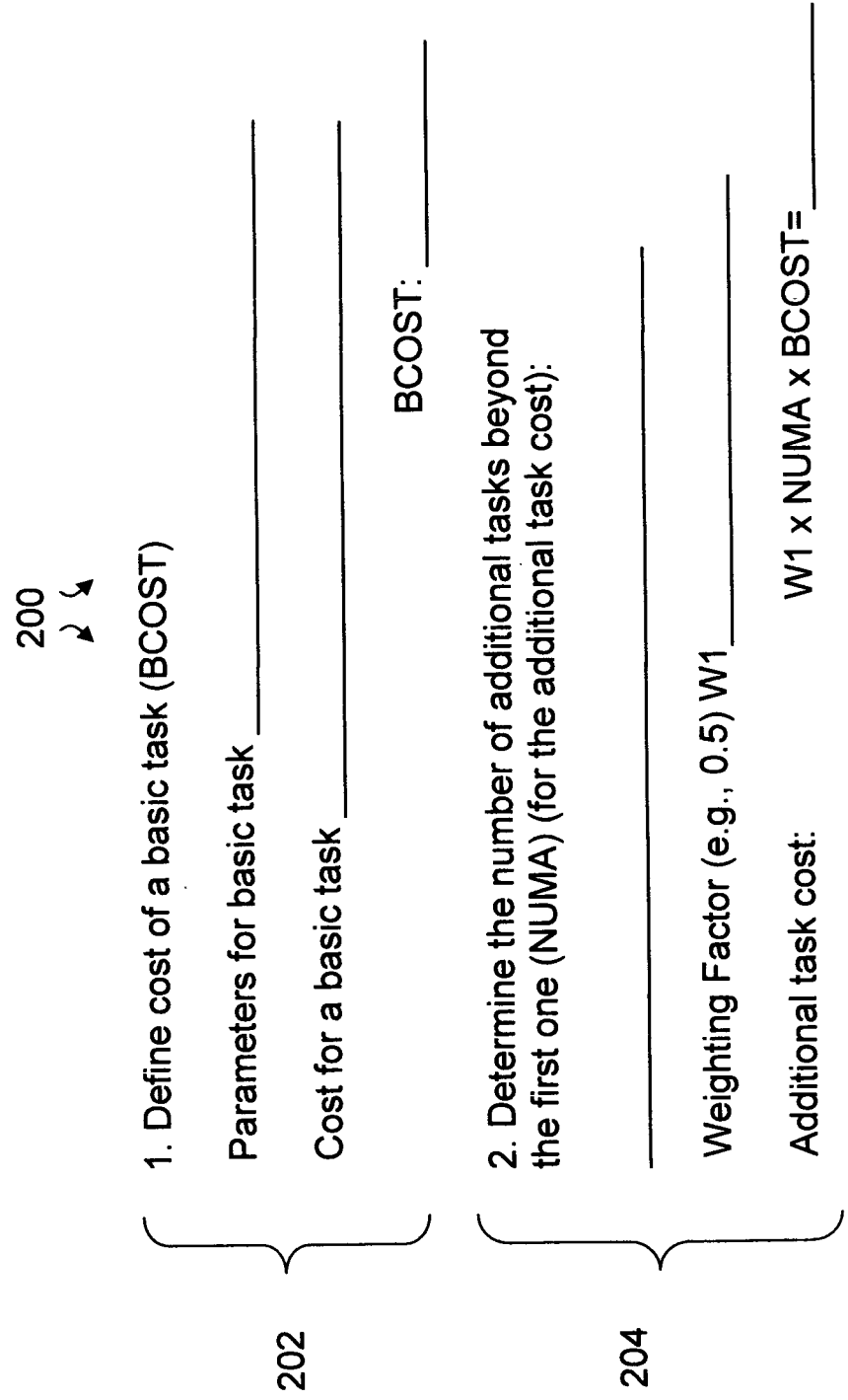

FIG. 6 (see partial views FIGS. 6A, 6B, and 6C) shows an estimation template or worksheet 200 for one embodiment of the invention based on Equation 1. The sample template 200 shown in FIG. 6 is also suitable as a template for a software user interface 32, which can be a text interface, or as a basis for a graphic user interface (GUI). The first section 202 of the template 200 requests information for calculating the basic task variable. The second section 204 of the template 200 requests information for calculating the additional task cost variable. The third section 206 of the template 200 requests information for calculating the additional page cost. The fourth section 208 of the template 200 requests information for calculating the additional figure input cost. The fifth section 210 of the template 200 requests information for calculating the complexity cost. The sixth section 212 of the template 200 requests information for calculating the input timing cost. The seventh section 214 of the template 200 requests information for calculating the input quality cost. The eighth section 216 of the template 200 requests information for calculating the market variable. The ninth section 218 of the template 200 requests information for calculating the total project cost.

In one embodiment, the complexity cost 42 is measured by the software (e.g. a complexity module), for instance by analyzing the type and level of complexity of the input information. For example, a complexity module analyzes the number and type of technical or scientific keywords to derive a rating of complexity. The complexity module can engage in various analyses. For example, if keywords are present in an unusual combination with keywords from different technical fields, then the complexity module assigns a high level of complexity based on the assumption that the input information combines technologies that are not usually combined, and can require expertise from two or more technical fields to complete the task (e.g., requires two or more implementers of the project from different fields to complete the task). The complexity module can also receive input from the inventors, a user of the project estimation application 30, or one or more experts in the relevant technological areas as part of the determination of the complexity.

Projects are categorized as different predetermined types of complex projects. At a broad level, for example, projects include technical writing projects, legal projects (e.g., patent related projects), software projects, and other projects. Tasks include technical writing tasks, patent related tasks, and programming tasks (e.g., software development). The basic task can be (i) a writing task, such as creating online help for a specific help module for a software application, (ii) a patent task, such as documenting one invention for a provisional patent application, or (iii) a software task, such as creating one software module (e.g., procedure, object, program, or other software entity). The scope of the invention is not limited to these three types of complex projects. The technical writing, patent drafting, and programming approaches of the invention are discussed in more detail in the following:

In one embodiment, the project is a technical writing project, which can include projects for software manuals, tutorials, reference manuals, getting starting guides, which can be developed in hard-copy and/or online help formats. For estimating technical writing tasks, the approach of the invention provides estimates for technical writing tasks such as producing a set of online help screens and/or hard copy manuals for use with a software product. For example, if the project is to document user tasks for a getting started online help system for a software product, the basic task cost 56 is for a typical basic task (e.g., "How to back up your data"). The first step is to determine the basic task characteristics. For example, the basic task is defined as 100 lines of text or about 2.5 "pages" of online help information. The next step is to assign a basic cost 56 to the typical basic task, such as, for example, creating online help for a topic (including studying specifications, interviewing developers, using the software product, writing the topic, revising, and other activities). The next step is to receive the task information for a project, including initial tasks and additional tasks. For example, the task information for developing documentation and/or online help for a software product includes, for example, the documentation tasks related to (i) installing the software product, (ii) performing some function (e.g., FunctionA), (iii) performing some other function (e.g., FunctionB), (iv) producing reports from the software product, (v) printing out reports, and (vi) backing up data.

Another example of a technical writing task is producing a self-contained reference "page" (either hard copy page or screen of online help), such as a UNIX man page. Such a page typically has a standard format with standard headings.

The quality of the input information is a significant factor in the technical writing task, for if the implementer receives little input, the implementer (e.g., technical writer) spends significantly more time using or running the software and/or interviewing the appropriate software developers.

NUML in Equation 1 is the number of writing tasks that have been submitted late (that is, after submission of the description for the initial basic writing task). The TIME expression is an additional cost for the late or delayed addition or receipt of new information 59 (beyond clarification and limited expansion, as may be normal during the review process for a writing task). W5 is a weighting factor for the TIME variable that can be set to a value of 1, but can be adjusted to provide a weighting of the timing issue. For example, the weighting factor W5 can be set to a value higher than 1, if timing is critical for a certain type of project, and delay in input impacts the project substantially.

Generally, the weighting factors can have a value less than one (though not required to do so). For example, the weighting factor for the addition of further pages of text or figures may be less than one, because it takes somewhat less time to process the additional pages because some efficiency is gained by having basic concepts previously explained, by the writer gaining greater familiarity with the specific area (e.g., specific technology area), by the writer gaining greater familiarity with the software application being documented, and other efficiency gains.

In one embodiment, the project is a legal project. Such legal projects can include legal briefs, legal opinions, and patent related projects. A patent related project can include projects for drafting a provisional patent application, a nonprovisional patent application, legal analysis, legal opinion and other tasks. For estimating patent drafting tasks, the approach of the invention provides estimates, for example, drafting provisional patent applications or nonprovisional patent applications, and/or parts of these applications. For example, the cost for preparing a provisional patent specification based on a basic task input (e.g., invention disclosure) can be set at various prices depending on the experience of the drafter of the provisional patent specification. For a patent specification, the number of basic writing tasks is the number of inventions or major embodiments of an invention to be written up. An additional description may represent a new inventive idea, or another major embodiment of the same inventive idea. For example, for a patent specification, the basic cost represents a basic task with a defined input. The basic task is based on input information that is, for example, no more than 5 pages of double space text, and no more than 2 drawings (assuming that drawings are appropriate for the task). The user of the project estimator application 30 uses various criteria to determine if the task is properly defined as a basic task. For example, the invention disclosure discloses one major embodiment of one invention. Some other explanatory information may be present such as a listing of equivalent features or components for some aspect of the invention.

The W2 weighting factor for additional pages can be adjusted (e.g., lowered) because it takes somewhat less time to process additional pages because some efficiency is gained by having basic concepts previously explained, by the patent application drafter gaining greater familiarity with the specific area (e.g., specific technology area of the invention being described), gaining greater familiarity with issues related to the write-up (e.g., the context, such as problem/solution context for a patent specification), and other efficiency gains.

The W1 weighting factor for the number of additional tasks can be less than one. For example, if the additional task represents an additional embodiment of an invention, then some basic concepts have probably been introduced in the description of the basic invention, and do not need to be rewritten or repeated for each additional embodiment of the invention. For example, the value of W1 can be 0.50 (e.g., in a range of 0.1 to 0.9) for additional embodiments of an invention described in a patent specification, assuming that the basic invention and each embodiment have an adequate invention description.

For very complex patent applications, such as in the biotech (biological technology) field, where multiple writers and reviewers (for different aspects of the technology) are assigned to a project, higher values for complexity may be appropriate, such as 2 or 3 or higher.

Quality characteristics for input information 58, 59 for a patent writing project include clarity of writing, focus, appropriate terminology, proper use of jargon, organization, appropriate level of detail, completeness and other characteristics. Also, if the invention disclosure is based on an interview, with no, or very little, written description provided, then the value of QUAL should be 1 or close to 1.

In one embodiment, the project is a software project, which can include projects for programming and developing a software application, a client-server application, a testing module for an application, and other software development projects. For estimating programming tasks, the approach of the invention provides estimates for programming or software development tasks, which include, for example, developing parts of an applications, a client portion of an application (e.g., client applet for a networked application), a server portion of an application (e.g., servelet for a networked application), user interface software, one or more objects, web services, software routines, software modules, and/or other software entities The task for a programming project can be a software module, procedure, or object that represents a definable task. The input information 58 can be specified in terms of pages of input specification (e.g., design descriptions, functional specifications, and other suitable design documents). In one approach, the input information 58 can be based on class definition files. The input information 58 can also be specified primarily in diagrams, in various software development diagrams, such as flowcharts, object diagrams, data flow diagrams, data structure diagrams, and other suitable diagrams. The quality of the preparation of the input (e.g., QUAL in Equation 1) is a significant issue, because if complete specifications are not available for a team of implementers, then each implementer (e.g., software developer) spends additional time completing the design, as the work progresses, and/or communicating with other members of the team to verify design issues. If the input specifications are not available or incomplete, then the value of QUAL in Equation 1 should be 1 or close to 1 (indicating a low quality of preparation of input to the project). Delayed or changed input 59 (e.g., affecting the TIME variable in Equation 1) is also a significant issue, because code that was based on the original input can require changes.

For a programming estimate, the basic task input information needs to be defined appropriately. For example, a basic task can be defined as an object having no more than one page (e.g., 40 lines) of class definitions. If there are 10 objects in the system, with a total of 15 pages of class definitions, then there are 5 additional pages of input information (e.g., for the PAGFAC variable in Equation 1). In some cases, input could be expressed as lines of code, such as 40 lines (or more) lines of code per "page," or unit of input material; for example, when the project involves porting an existing application to a different programming language or system. Generally, for any type of project, the approach of the invention does not require any specific size for a page, which can be defined to be various amounts or number of lines of characters (e.g., alphanumeric text) or other suitable input.

Complexity (e.g., COMP in Equation 1) can be a significant issue. For example, the number of objects and number of pages of class definitions may or may not reflect the complexity of the software involved. For example, a simple message handling object may not require a great deal of complexity; however, an object implementing a complex algorithm or equation provides much more complexity, and thus effort to implement. The type of additional input can be significant and can increase the value for complexity. For example, a single additional complex flowchart figure can indicate significant additional coding effort to fulfill all the functionality indicated in the flowchart.

In another embodiment, the approach of the invention is based on a machine learning approach or artificial intelligence approach. In one embodiment, the approach of the invention makes adjustments, such as adjusting the value of one or more weighting factors based on a learning or training set of data (e.g., historical data including project data, estimated project costs 66 and actual costs for each project). Such approaches include neural networks and other suitable machine learning approaches. Artificial intelligence approaches such as expert system and/or rules-based systems can also be appropriate. A rules based approach can be used to establish rules about how to set one or more of the weighting factors. For example, a rule can be established recognizing that delayed or late input 59 has more of an impact if complexity of the project is high. In another example, if additional text is tightly coupled with a figure and explains the figure well, then the PAGFAC and FIGFAC variables are closely related (e.g., the providing of additional figures does not have such a great impact if they are well explained). Other variables can also be related (e.g., by rules). For example, if the project is highly complex, then the impact of low quality input can be high.

The costs for a project can also be expressed in various ways and mapped from one numerical system to another. In one embodiment, the total project cost 66 can be based on a numeric scale including a range of numbers. For example, the total project cost 66 can be expressed using a scale ranging from a low value of 1 (one) (highest cost or most effort) to a high value of 10 (ten) (lowest cost or least effort), or conversely from a low value of 1 (one) (lowest cost or least effort) to a high value of 10 (ten) (highest cost or most effort). The low value can be based on a value or 0 or 1, or minus values. Such numeric scales can be based on any appropriate values and range, such 0 to 10, −10 to 10, 0 to 100, 0 to 1000, 10 to 0, 100 to 0, 1000 to 0, and other ranges appropriate for such numeric scales.

Such scales can be developed by mapping values from the results (such as total project cost 66) produced by Equation (1). In one embodiment, the results produced from Equation (1) typically fall between certain values; for example, 5000 and 15000 (dollars or other units) for a certain type of project; which can be mapped to a predetermined or given numeric scale. These results can be mapped to a scale of 0 (zero) to 10 (ten), wherein the numeric scale value of 0 (zero) corresponds to a cost of 5000 and the numeric scale value of 10 (ten) corresponds to a cost of 15000. In this case, values that are greater than 15000 could be matched to a value of 10 (ten), or, if extreme, treated as special cases. Alternately, in this embodiment, the numeric scale value of 10 (ten) corresponds to a cost of 5000 and the numeric scale value of 0 (zero) corresponds to a cost of 15000.

In another embodiment, a numeric scale value is calculated directly from Equation 1. For example, BCOST is assigned a value of 1 and given appropriate values (e.g., a basic project has 5 pages of input material and 2 figures). Thus, in this approach, if a project has the characteristics of a basic, well defined project, then the ESTIMATE or total project cost 66 is 1 for a basic project in a numeric scale of 1 to 10, where 1 indicates the lowest value and 10 the highest. A sample calculation is described in the following: The NUMA (number of additional tasks) has a value of 2 and the W1 weighting factor has a value of 0.5, so that the additional task cost 62 has a value of 1.0. The number of extra pages is 5, so that the value of PAGFAC is 5/5 or 1.0, and the W2 weighting factor has a value of 0.5, so that the value of additional input pages is 0.5. The number of extra figures is 2, so that the value of FIGFAC is 2/2 or 1.0, and the W3 weighting factor has a value of 0.5 so that the value of additional figures is 0.5. The COMP value is 1 (for complexity), NUMT (number of tasks) has a value of 3, and the W4 weighting factor has a value of 0.5, so that the complexity cost 42 is 1.5. The additional input cost 64 is the sum of the additional input page cost (value of 0.5) plus the additional figures cost (value of 0.5) resulting in value of 1.0 for the additional input cost 64. The quality of preparation of the input material is high, giving QUAL a value of 0. The total project cost 66 is the basic tasks cost 56 (value of 1.0) plus the additional task cost 62 (value of 1.0) plus the additional input cost 64 (value of 1.0 obtained by summing the additional input pages and figure costs) plus the complexity cost 42 (value of 1.5) for a total project cost 66 having a value of 4.5.

In one embodiment, a computer program product including a computer readable medium (e.g., one or more of DVD's, CD's, diskettes, tapes, and/or other suitable medium) provides software instructions for all or part of the software described herein (e.g., project estimation application 30, the user interface 32, the analyzer 34, and/or the estimator 36). The computer program product can be installed from the computer readable medium by any suitable software installation procedure, as is well known in the art. In another embodiment, the computer readable medium is a computer program propagated signal product embodied on a propagated signal on a propagation medium (e.g., an electrical signal propagated over the Internet or other network, a radio wave, an infrared wave, or other electromagnetic wave) provides software instructions for all or part of the software described herein (e.g., project estimation application 30, the user interface 32, the analyzer 34, and/or the estimator 36). Alternatively, the propagated signal is an analog carrier wave or a digital signal carried on the propagated medium. For example, the propagated signal can be a digitized signal propagated over the Internet or other network. In one embodiment, the propagated signal is a signal that is transmitted over the propagation medium over a period of time, such as the instruction for the software described herein (e.g., project estimator application 30, the user interface 32, the analyzer 34, and/or the estimator 36) sent in segments (e.g., packets) over a network over a period typically of seconds, minutes, or longer.

Having described the preferred embodiments of the invention, it will now become apparent to one of skill in the arts that other embodiments incorporating the concepts may be used. It is felt, therefore, that these embodiments should not be limited to the disclosed embodiments but rather should be limited only by the spirit and scope of the following claims.

For example, the estimating device 24 is a computing device such as a digital computer based on a digital microprocessor. The estimating device 24 can also be a laptop computer, a palmtop computer, or other computing device. The estimating device 24 can also be part of another device, such as an estimating device 24 that is part of a mobile telephone or other electronic device.

In another example, the functions of the invention as described herein can be implemented in a hardware device, such as an integrated circuit (IC), an ASIC (application specific integrated circuit), PLD (programmable logic device), or programmable gate array.

In a further example, the user interface 32, the analyzer 34, and/or the estimator 36, can be located in two or more different devices or computers. For example, the user interface module 32 can be a client or markup language (e.g., HTML) interface located on a local or client computer, and the analyzer module 34 and estimator module 36 can be located on one or more servers or other computing devices. Generally, the approach of the invention can be implemented in a distributed computing and/or networked approach, such as a client/server approach, a distributed object approach, a Web services approach, or other suitable distributed computing approach.

What is claimed is:

1. A system for estimating a cost of a project comprising one or more tasks, the system comprising:
   a memory storing instructions for estimating the cost of the project; and
   a processor coupled to the memory, the processor performing the instructions to configure the processor to:
   determine characteristics for a basic task in a predetermined type of project, comprising an input quantity for the basic task;
   receive an assigned cost for the basic task;
   receive task information for an expected project comprising initial task information for an initial task and additional task information for additional tasks, the expected project comprising the initial task and the additional tasks;
   analyze the task information based on the basic task characteristics;
   determine costs comprising an additional task cost, an additional input cost, a complexity cost, an input timing cost, and an input quality cost, the costs based on analyzing the task information and the input quality cost based on a quality of preparation of the task information, the input quality cost having an inverse relationship to the quality of preparation of the task information; and
   estimate a total project cost for the expected project based on the basic task cost, the additional task cost, the additional input cost, the complexity cost, the input timing cost, and the input quality cost.

2. The system of claim 1, wherein the instructions further configure the processor to determine the additional cost for the additional tasks based on the basic task characteristics; determine an amount of total additional input based on the additional task information and one or more predetermined minimums based on the basic task characteristics, and a total additional input cost based on the amount of total additional input; determine the complexity cost based on an assessment of complexity of the initial task and the additional tasks; determine the input timing cost based on a timing of receiving of delayed input after a beginning of the project; and determine the input quality cost based on a quality of preparation of the initial task information and the additional task information.

3. The system of claim 1, wherein the instructions further configure the processor to estimate the total project cost based on a numeric scale comprising a range of numbers.

4. The system of claim 1, wherein the project is a technical writing project and the task information is technical writing task information.

5. The system of claim 1, wherein the project is a patent related project and the task information is patent related task information.

6. The system of claim 1, wherein the project is development of a software application and the task information is software task information.

7. The system of claim 1, wherein the instructions further configure the processor to estimate the total project cost by summing the basic cost, the additional task cost, the additional input cost, the complexity cost, the input timing cost, and the input quality cost, wherein
   the additional task cost is (W1×NUMA×BCOST), wherein NUMA is a number of additional tasks beyond the basic task and BCOST is the cost for a basic task, wherein the input quantity is based on a predetermined number of pages and figures received as input for the basic task;
   the additional input cost is a sum of (W2×PAGFAC×BCOST) and (W3×FIGFAC×BCOST), wherein PAGFAC is a page factor variable for a number of additional pages beyond a predetermined minimum number of input pages, and FIGFAC is a figure factor variable for a number of additional figures beyond a predetermined minimum number of input figures;
   the complexity cost is (W4×COMP×NUMT×BCOST), wherein COMP is a measure of the complexity of the initial task and the additional tasks, and NUMT is a total number of the tasks;
   the input timing cost is (W5×TIME×NUML×BCOST), wherein TIME is a variable representing a timing for receiving of delayed input, and NUML is a number of tasks that are received late; and
   the input quality cost is (W6×QUAL×NUMT×BCOST), wherein QUAL is a variable representing a quality of preparation of input information, a value of QUAL ranging between 0 (zero) and 1 (one), inclusive, with 0 (zero) indicating a high quality of input and 1 (one) a low quality of input;
   wherein W1, W2, W3, W4, W5, and W6 are optional weighting factors.

8. A system for estimating a cost of a project comprising one or more tasks, the system comprising:
   means for determining characteristics for a basic task in a predetermined type of project, comprising an input quantity for the basic task;
   means for receiving an assigned cost for the basic task, and receiving task information for an expected project comprising initial task information for an initial task and additional task information for additional tasks, the expected project comprising the initial task and the additional tasks;
   means for analyzing the task information based on the basic task characteristics;

means for determining costs comprising an additional task cost, an additional input cost, a complexity cost, an input timing cost, and an input quality cost, the costs based on analyzing the task information and the input quality cost based on a quality of preparation of the task information, the input quality cost having an inverse relationship to the quality of preparation of the task information; and means for estimating a total project cost for the expected project based on the basic task cost, the additional task cost, the additional input cost, the complexity cost, the input timing cost, and the input quality cost.

9. The system of claim 8, wherein the system comprises:

means for determining the additional cost for the additional tasks based on the basic task characteristics;

means for determining an amount of total additional input based on the additional task information and one or more predetermined minimums based on the basic task characteristics, and a total additional input cost based on the amount of total additional input;

means for determining the complexity cost based on an assessment of complexity of the initial task and the additional tasks;

means for determining the input timing cost based on a timing of receiving of delayed input after a beginning of the project; and means for determining the input quality cost based on a quality of preparation of the initial task information and the additional task information.

* * * * *